UNITED STATES PATENT OFFICE 2,402,791

REACTION PRODUCT OF OXAZOLINES

Herbert L. Wampner, Burlingame, Calif., assignor to Commercial Solvents Corporation, Terre Haute, Ind., a corporation of Maryland No Drawing. Application May 11, 1944,
Serial No. 535,207

9 Claims. (Cl. 252—8.8)

My invention relates to new and useful products resulting from the chemical combination of an acid with an oxazoline. More particularly, it is concerned with compounds produced by the chemical combination of organic acids with an oxazoline having the following structural formula:

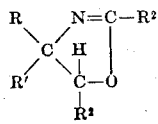

in which R and $R^1$ represent hydrogen, hydroxymethyl, or an alkyl group, and $R^2$ is either hydrogen or alkyl.

The products which constitute the subject matter of the present invention may be prepared in accordance with any of several suitable procedures. I prefer, however, to produce such materials by reacting approximately equimolecular quantities of the oxazoline with the desired acid in the presence of water. The acid is preferably added to the mixture of water and oxazoline, with thorough agitation, and the stirring continued after all of the acid had been added, until a clear solution is obtained. Occasionally, slightly opaque solutions are produced; however, in such instances the addition of a suitable solvent such as ethyl alcohol, will generally result in the procurement of a clear solution. The reaction may be carried out over a relatively wide temperature range. However, I have found it more practical for my purposes to carry it out between temperatures of from about 25–75° C. Also, the quantity of water utilized may vary, and in certain cases may be omitted, depending upon the particular reactants employed, as well as the desired physical characteristics of the reaction products produced.

The exact structure and chemical composition of the products produced as generally described above, is unknown to me. However, it is believed that the system represented by the following equations is involved.

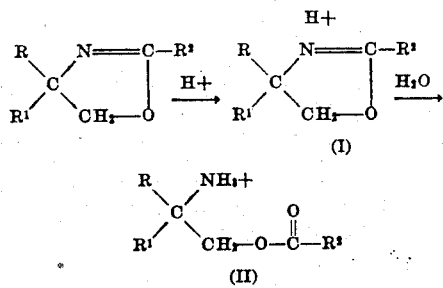

The extent to which the heterocyclic salt (I) and the open chain salt (II) are present in the mixture will of course depend on several conditions,
such as, for example, the specific oxazoline employed, the nature of the acid which enters into chemical combination with the oxazoline, the quantity of acid employed, the amount of water present in the mixture, and the temperature to which the resulting reaction product is subjected.

The oxazolines utilized in preparing the products of the present invention may be any of a number of such compounds, as for example, 2-ethyl-4-hydroxymethyl-4-methyloxazoline, 2-isopropyl - 4 - hydroxymethyl - 4 - methyloxazoline, 2 - heptyl - 4 - hydroxymethyl - 4 - ethyloxazoline, 2 - tridecyl - 4 - hydroxymethyl - 4 - methyloxazoline, 2 - octyl - 4 -hydroxymethyl - 4-ethyloxazoline, 2 - hendecyl - 4 - hydroxymethyl-4 - methyloxazoline, 2 - hendecyl - 4 - hydroxymethyl - 4 - ethyloxazoline, 2 - heptyl - 4 - (hydroxymethyl) oxazoline, 2 - heptyl - 4,4 - bis (hydroxymethyl) oxazoline, 2-octyloxazoline, 2-hendecyl-4,4-bis (hydroxymethyl) oxazoline, 2-hendecyloxazoline, 2-hendecyl-4,4-dimethyloxazoline, and the like.

The oxazolines of the above-mentioned type may be prepared in accordance with any suitable procedure. For example, they are conveniently produced by reacting a suitable aminohydroxy compound with the desired fatty acid in approximately equimolecular quantities. The initial temperature employed in carrying out the reaction is preferably maintained at between about 130° C. and 170° C., depending upon the particular aminohydroxy compound and fatty acid employed. The initial stage of this reaction yields the corresponding amide, after which the temperature is increased to from about 170° C. to approximately 215° C., or slightly higher, thereby resulting in the thermal elimination of an equivalent of water to give the desired oxazoline. As examples of the fatty acids which may be employed in preparing the above oxazolines, there may be mentioned acetic acid, propionic acid, the butyric acids, caprylic acid, capric acid, lauric acid, myristic acid, oleic acid, stearic acid, the fatty acids contained in coconut oil, and the like.

Examples of suitable aminohydroxy compounds are 2-methyl-2-amino-1-propanol, 2-methyl-2-amino-1,3-propanediol, 2-ethyl-2-amino-1,3- propanediol, tris (hydroxymethyl) aminomethane, 2-amino-1-butanol, 2-amino-1-pentanol, 2-amino-1-ethanol, 2-amino-3-butanol, 3-amino-4-pentanol, 3-amino-4-hexanol, 2-amino-3-heptanol, and the like.

As suitable examples of the acids which are utilized in combining with the above-mentioned oxazolines to form the reaction products of the present invention there may be mentioned lactic acid, citric acid, tartaric acid, hydroxyacetic acid, mucic acid, and the aliphatic monocarboxylic acids such as acetic, butyric, hexoic, lauric, myristic, oleic, etc.

Although a relatively large number of products lie within the scope of the present invention, only a few are illustrated by the following specific examples. It is to be understood, therefore, that such examples are typical of the products claimed by the present invention, and accordingly it is intended that the examples which follow are in no way to be considered limitative.

EXAMPLE I

To a mixture consisting of 1445 parts of water and 296 parts of 2-tridecyl-4-hydroxymethyl-4-ethyl-oxazoline was added 210 parts of citric acid monohydrate. The reaction was carried out at a temperature of about 25–30° C., in the presence of agitation which was continued after all of the citric acid had been added, until a substantially clear solution was obtained. The resulting product exhibited surface active properties and was found to retain such characteristics when dissolved in acid solution.

EXAMPLE II

An acid soluble soap was prepared as described above, employing the reactants in the following proportions:

| | Parts |
|---|---|
| Water | 1000 |
| Oxazoline formed from tris(hydroxymethyl)amino-methane and coconut oil fatty acids | 272 |
| 51% lactic acid | 176 |

EXAMPLE III

A clear solution of an acid soluble soap was prepared at room temperature by the method outlined in Example I. The ingredients and the proportions thereof employed are listed below:

| | Parts |
|---|---|
| Water | 103.0 |
| 2-isopropyl-4-hydroxymethyl-4-methyl-oxazoline | 15.7 |
| Citric acid monohydrate | 21.0 |

The quantity of the new wetting agents of the present invention, which may be utilized, will be found to vary with the type of wetting process contemplated, as well as with the material to be wetted. For general use, however, I have found it satisfactory to employ these wetting agents in amounts of from about 0.1 to 1.0 per cent by weight of the treating bath.

The wetting power of certain of the products of the present invention is demonstrated in the table appearing below, and was measured by the method of Draves and Clarkson (Amer. Assn. Textile Colorist and Chemists' Year Book, 17, pp. 216–222 (1940)) which determines the sinking time required for a 5-gram skein of unboiled 2-ply cotton yarn in aqueous solutions of the wetting agent at a temperature of 30° C.

Table I

| Wetting agent | Grams per liter | Sinking time, seconds |
|---|---|---|
| Reaction product of 2-tridecyl-4-hydroxymethyl-4-methyloxazoline and citric acid monohydrate | 8 | 80 |
| Reaction product of 2-undecyl-4,4-bis(hydroxymethyl) oxazoline and tartaric acid | 8 | 38 |
| Reaction product of 70% hydroxy acetic acid and oxazoline from coconut oil fatty acids and 2-amino-2-methyl-1,3-propanediol | 8 | 27 |
| The reaction product of 2-undecyl-4-hydroxymethyl-4-methyloxazoline and 51% lactic acid | 5 | 47 |

While the acid soluble soaps of my invention, i. e., those prepared from an organic acid and a suitable oxazoline, possess excellent surface active properties, I have observed that analogous products prepared from the inorganic acids possess certain material defects which render them of little or no practical value. For example, the reaction product of sulfuric acid and 2-undecyl-4,4-bis(hydroxymethyl)-2-oxazoline is of no value whatever as an instantaneous wetting agent, while the reaction product from hydrochloric acid and the same aminohydroxy compound has been found to lose its surface active properties on standing for extended periods of time, thus rendering it impractical from the standpoint of general industrial use. These defects of the above mentioned products are clearly demonstrated in the table below and are compared with a typical acid soluble soap of the present invention from the standpoint of ability to retain surface active properties on storage. The products listed below were prepared in accordance with the procedure given above and the wetting power thereof determined by the same procedure as previously discussed. For simplicity the reaction product of hydrochloric acid and 2-undecyl-4,4-bis(hydroxymethyl)-2-oxazoline will be designated as "Product A," the material from sulfuric acid and 2-undecyl-4,4-bis(hydroxymethyl)-2-oxazoline as "Product B," and the product from lactic acid and the same aminohydroxy compound as "Product C."

Table II

| Age of wetting agent | Concentration of wetting agent, percent | Sinking time, seconds | | |
|---|---|---|---|---|
| | | Product A | Product B | Product C |
| Freshly prepared | 0.5 | 15 | >240 | 13 |
| 1 day | 0.5 | 15 | | 13 |
| 1 week | 0.5 | 13 | | 12 |
| 4 weeks | 0.5 | 25 | | 16 |
| 7 weeks | 0.5 | 24 | | 15 |
| 11 weeks | 0.5 | 70 | | 16 |
| 15 weeks | 0.5 | 175 | | 23 |

The products of the present invention are suitable for use in numerous widely-different industrial processes requiring surface active agents, and such products may be employed alone or in combination with various other surface active substances. These materials can be used advantageously to assist in twist-setting of yarn, in processes of stripping colors, in scouring and cleaning operations on textile fabrics and fibers, furs, metals, plastics, ceramics, and as an ingredient in compositions employed as general detergents, dish-washing compounds and shampoos. They also are found to be useful as assistants in the application of dyestuffs. Thus, for example, because of their wetting and penetrating properties in acid or neutral dyeing baths, they are capable of facilitating dyeing with developed dyes, and the like.

This case is a continuation-in-part of U. S. Serial No. 442,135, filed May 7, 1942.

Having described my invention, what I claim is:

1. The product resulting from the chemical combination of approximately equimolecular proportions of an acid selected from the group consisting of lactic acid, citric acid, tartaric acid, mucic acid, unsubstituted aliphatic monocarboxylic acids, and hydroxyacetic acid with an oxazoline having the following formula:

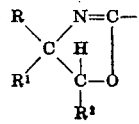

in which R and R¹ represent a radical selected from the class consisting of hydrogen, hydroxymethyl and alkyl, and R² is a member of the class consisting of hydrogen and alkyl, at a temperature of between about 25–75° C.

2. An aqueous bath for the wet treatment of organic fibrous materials possessing improved surface active properties comprising an added product resulting from the chemical combination of approximately equimolecular proportions of an acid selected from the group consisting of lactic acid, citric acid, tartaric acid, mucic acid, unsubstituted aliphatic monocarboxylic acids, and hydroxyacetic acid with an oxazoline having the following formula:

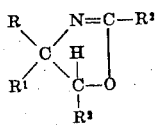

in which R and R¹ represent a radical selected from the class consisting of hydrogen, hydroxymethyl and alkyl, and R² is a member of the class consisting of hydrogen and alkyl, at a temperature of between about 25–75° C.

3. The product resulting from the chemical combination of approximately equimolecular proportions of an acid selected from the group consisting of lactic acid, citric acid, tartaric acid, mucic acid, unsubstituted aliphatic monocarboxylic acids, and hydroxyacetic acid with an oxazoline having the following formula:

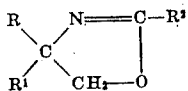

in which R and R¹ represent a radical selected from the class consisting of hydrogen, hydroxymethyl and alkyl, and R² is a member of the class consisting of hydrogen and alkyl, at a temperature of between about 25–75° C.

4. The product resulting from the chemical combination of an approximate equimolecular proportion of lactic acid with the oxazoline formed by the action of coconut oil fatty acids on tris(hydroxymethyl)aminomethane, at a temperature of between about 25–75° C.

5. The reaction product resulting from the chemical combination of approximately equimolecular proportions of hydroxy acetic acid and the oxazoline formed from coconut oil fatty acids and 2-amino-2-methyl-1,3-propanediol, at a temperature of between about 25–75° C.

6. The reaction product resulting from the chemical combination of approximately equimolecular proportions of tartaric acid with 2-undecyl-4,4-bis-(hydroxymethyl)oxazoline, at a temperature of between about 25–75° C.

7. A composition for the wet treatment of organic fibrous materials comprising an aqueous bath of improved surface active properties containing, in an amount sufficient to improve its surface active properties, a product resulting from the chemical combination of an acid selected from the group consisting of lactic acid, citric acid, tartaric acid, mucic acid, unsubstituted aliphatic monocarboxylic acids, and hydroxyacetic acid with an oxazoline having the following formula:

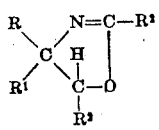

in which R and R¹ represent a radical selected from the class consisting of hydrogen, hydroxymethyl, and alkyl, and R² is a member of the class consisting of hydrogen and alkyl, at a temperature of between about 25–75° C.

8. A composition for the wet treatment of organic fibrous materials comprising an aqueous bath of improved surface active properties containing, in an amount sufficient to improve its surface active properties, a product resulting from the chemical combination of an acid selected from the group consisting of lactic acid, citric acid, tartaric acid, mucic acid, unsubstituted aliphatic monocarboxylic acids, and hydroxyacetic acid with an oxazoline having the following formula:

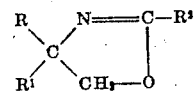

in which R and R¹ represent a radical selected from the class consisting of hydrogen, hydroxymethyl and alkyl, and R² is a member of the class consisting of hydrogen and alkyl, at a temperature of between about 25–75° C.

9. The process which comprises chemically combining at a temperature of between about 25–75° C. approximately equimolecular proportions of an acid selected from the group consisting of lactic acid, citric acid, tartaric acid, mucic acid, unsubstituted aliphatic monocarboxylic acids, and hydroxyacetic acid with an oxazoline having the following formula:

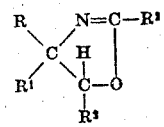

in which R and R¹ represent a radical selected from the class consisting of hydrogen, hydroxymethyl and alkyl, and R² is a member of the class consisting of hydrogen and alkyl.

HERBERT L. WAMPNER.